US012592549B2

(12) United States Patent
Pham et al.

(10) Patent No.: US 12,592,549 B2
(45) Date of Patent: Mar. 31, 2026

(54) GAS-FILLED SPARK GAP WITH HIGH FOLLOW CURRENT EXTINCTION CAPACITY

(71) Applicant: CITEL, Paris (FR)

(72) Inventors: Cong Duc Pham, Reims (FR); Yves Gannac, Reims (FR); Vincent Crevenat, Reims (FR); Vincent Lepauw, Reims (FR)

(73) Assignee: CITEL, Paris (FR)

( * ) Notice: Subject to any disclaimer, the term of this patent is extended or adjusted under 35 U.S.C. 154(b) by 206 days.

(21) Appl. No.: 18/533,810

(22) Filed: Dec. 8, 2023

(65) Prior Publication Data

US 2024/0204487 A1 Jun. 20, 2024

(30) Foreign Application Priority Data

Dec. 16, 2022 (FR) ....................................... 2213690

(51) Int. Cl.

*H01T 1/04* (2006.01)
*H01T 1/24* (2006.01)
*H01T 4/04* (2006.01)
*H01T 4/12* (2006.01)

(52) U.S. Cl.

CPC ................ *H01T 1/04* (2013.01); *H01T 1/24* (2013.01); *H01T 4/04* (2013.01); *H01T 4/12* (2013.01)

(58) Field of Classification Search

CPC .... H01T 1/04; H01T 1/24; H01T 4/04; H01T 4/12; H01T 1/20; H01T 4/14; H01T 1/02; H01T 1/22; H01T 4/02; H01T 4/10

USPC ........................................................ 361/120

See application file for complete search history.

(56) References Cited

U.S. PATENT DOCUMENTS

| | | | |
|---|---|---|---|
| 3,309,575 A | 3/1967 | Lee et al. | |
| 5,754,385 A | 5/1998 | Altmaier et al. | |
| 9,083,153 B2 | 7/2015 | Ehrhardt et al. | |
| 9,460,870 B2 | 10/2016 | Ramirez et al. | |

(Continued)

FOREIGN PATENT DOCUMENTS

| | | | | |
|---|---|---|---|---|
| EP | 0706245 A2 | 4/1996 | | |
| EP | 0793318 A1 * | 9/1997 | ............... | H01T 1/02 |

(Continued)

OTHER PUBLICATIONS

French Search Report and Written Opinion for FR2213690 mailed Aug. 31, 2023.

*Primary Examiner* — Sreeya Sreevatsa
(74) *Attorney, Agent, or Firm* — Notaro, Michalos & Zaccaria P.C.

(57) ABSTRACT

A gas-filled spark gap for the protection of an electrical installation includes a gastight casing and two elongate electrodes delimiting between them an inter-electrode space. The inter-electrode space includes successively a striking chamber and an arc-extinguishing chamber for extinguishing the electrical arc. The arc-extinguishing chamber includes mutually spaced divider plates. The gas-filled spark gap also includes two connecting terminals accessible from outside the casing and intended to enable electrical connection of the gas-filled spark gap to the electrical installation. The two connecting terminals are respectively electrically connected to the two elongate electrodes. Finally, the gas-filled spark gap includes an inert gas trapped in the casing.

20 Claims, 5 Drawing Sheets

(56) References Cited

U.S. PATENT DOCUMENTS

| | | | | |
|---|---|---|---|---|
| 10,186,842 | B2 | 1/2019 | Rozman | |
| 10,685,805 | B2 | 6/2020 | Rozman | |
| 2006/0104003 | A1* | 5/2006 | Gautier | H01T 4/10 361/120 |
| 2013/0235502 | A1* | 9/2013 | Hierl | H01T 4/14 361/137 |

FOREIGN PATENT DOCUMENTS

| | | | | |
|---|---|---|---|---|
| EP | 1914850 | A1 | 4/2008 | |
| EP | 1829176 | B1 * | 6/2010 | H01T 1/14 |
| EP | 2819137 | A1 | 12/2014 | |
| EP | 3226365 | A1 | 10/2017 | |
| EP | 3451473 | A1 | 3/2019 | |
| FR | 2880468 | A1 * | 7/2006 | H01H 9/36 |
| WO | WO-2006074721 | A1 * | 7/2006 | H01T 4/14 |
| WO | 2012016804 | A1 | 2/2012 | |
| WO | 2020043331 | A1 | 3/2020 | |

* cited by examiner

[Fig. 1]
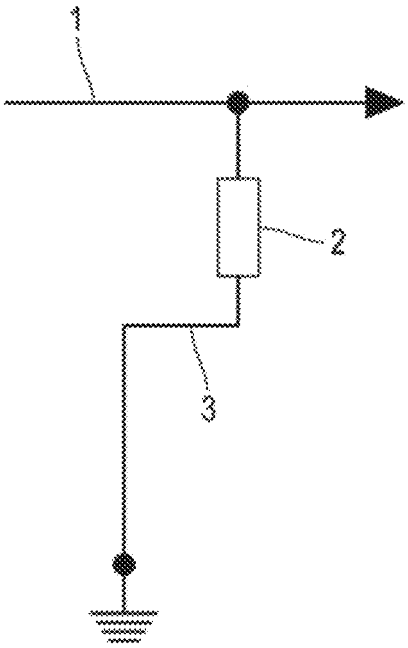
[Fig. 2]
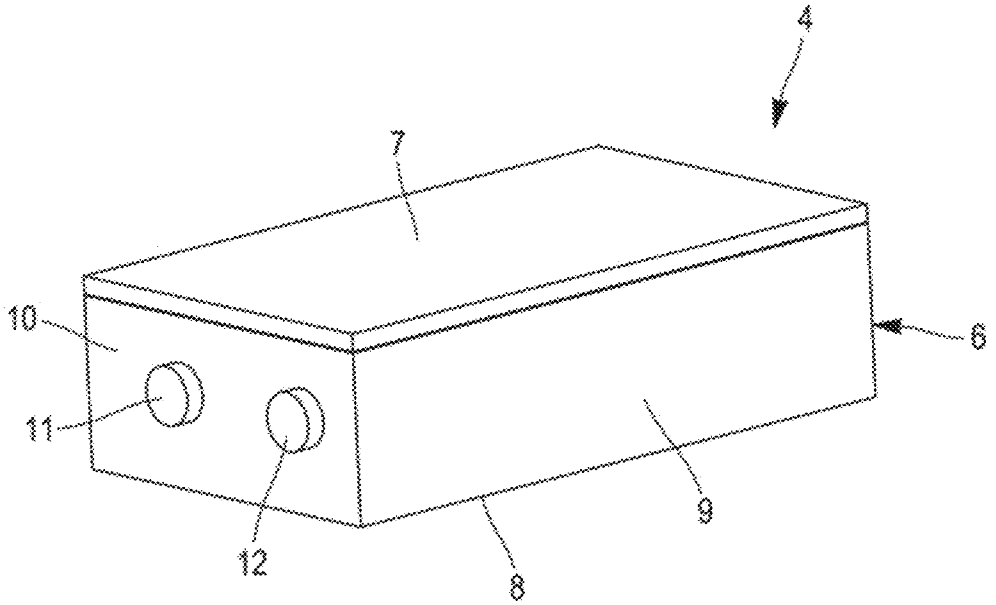

[Fig. 3]
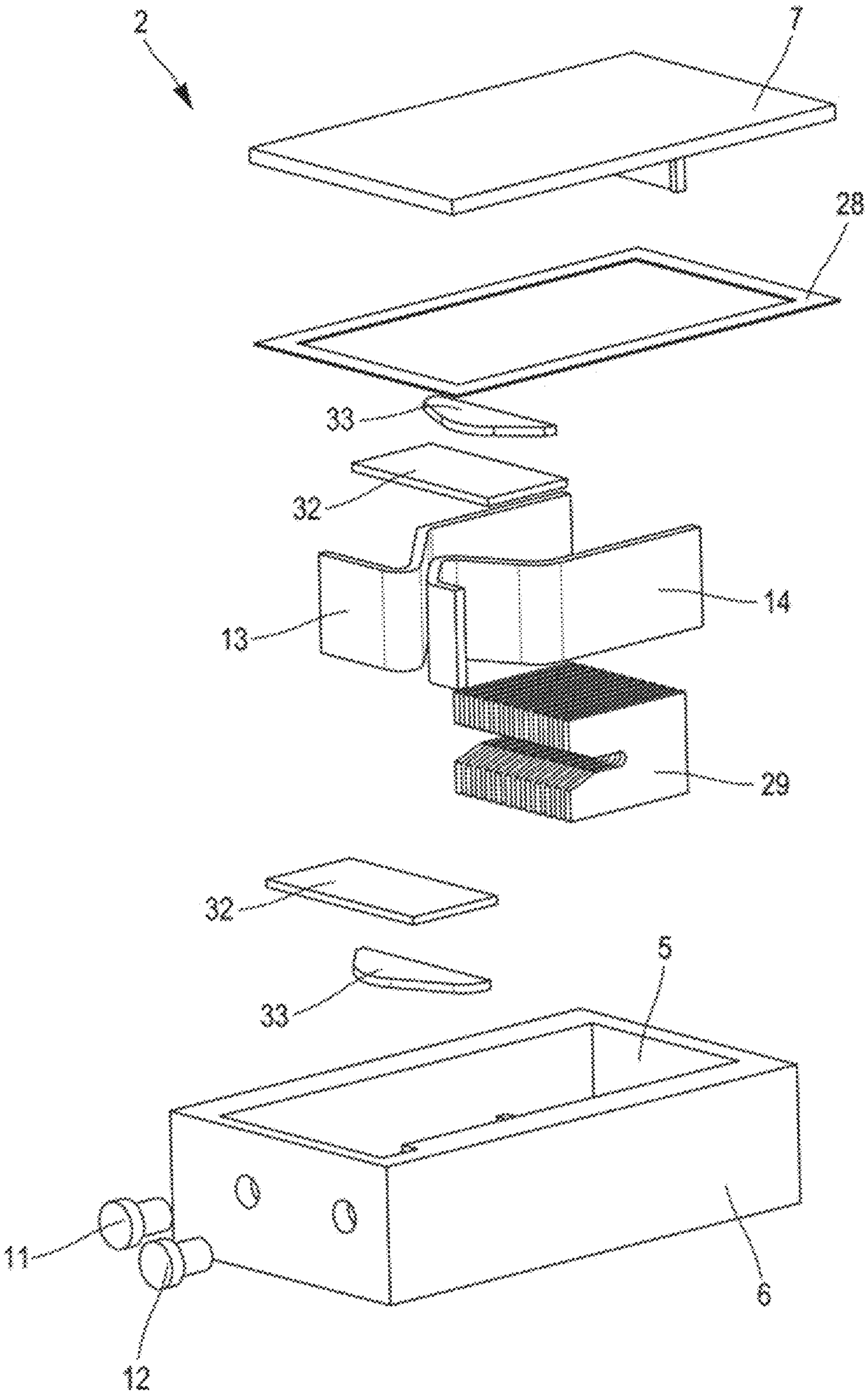

[Fig. 4]
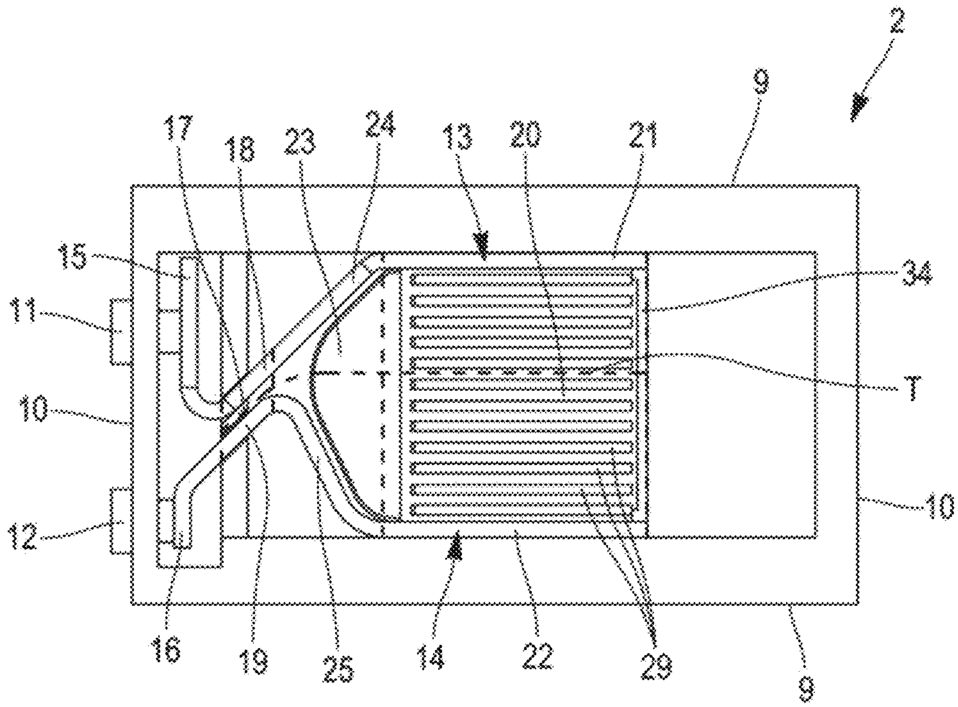
[Fig. 5]
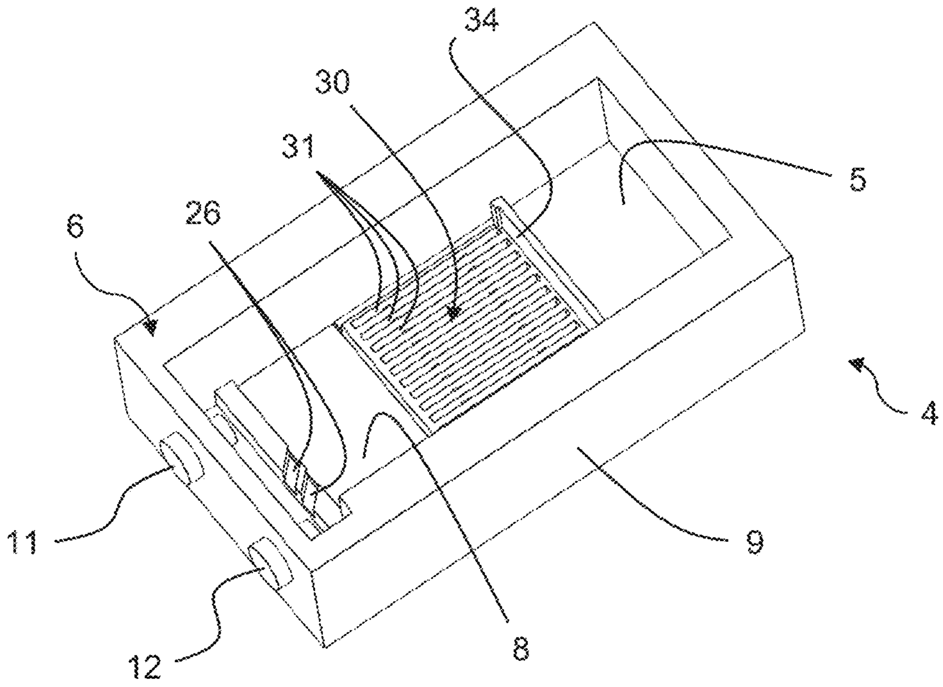

[Fig. 6]
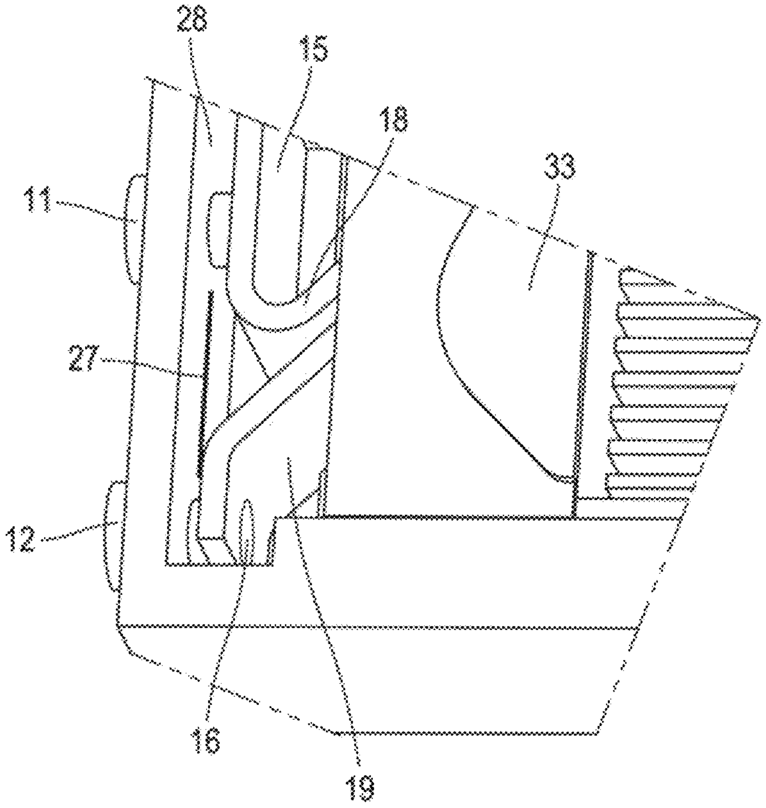

[Fig. 7]
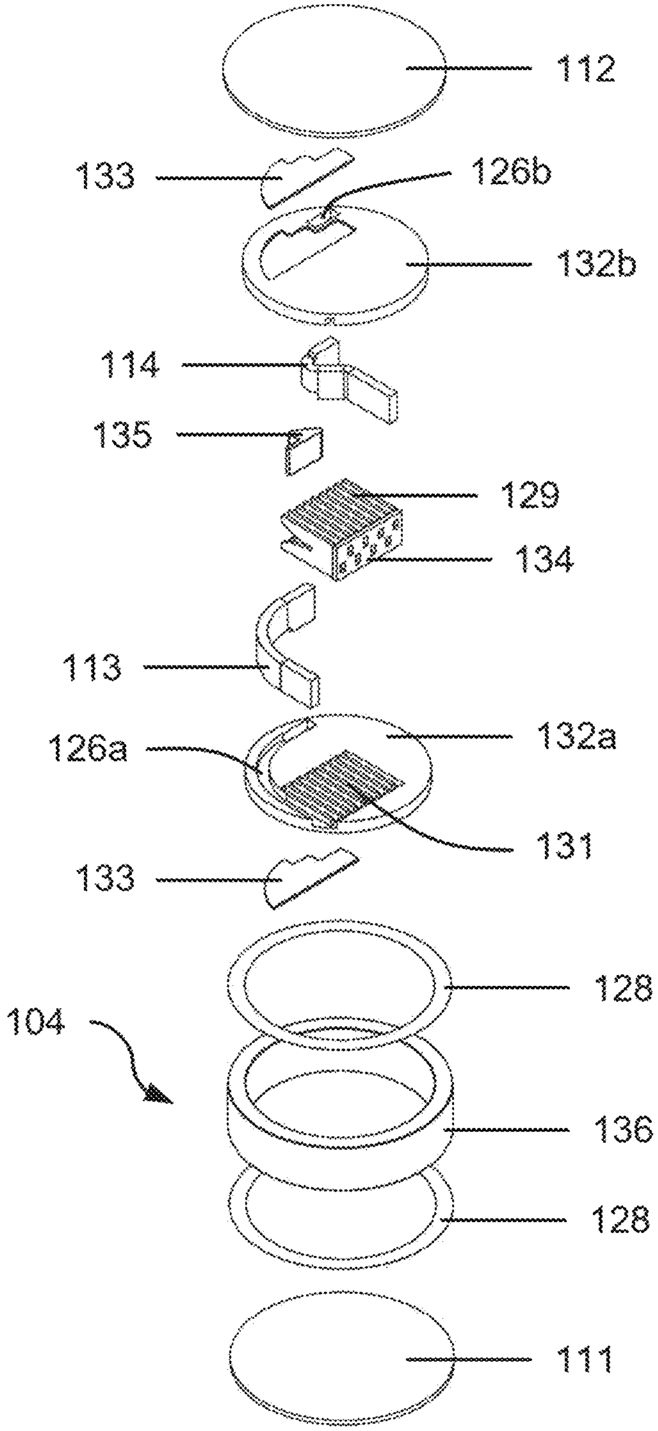

GAS-FILLED SPARK GAP WITH HIGH FOLLOW CURRENT EXTINCTION CAPACITY

CROSS REFERENCE TO RELATED APPLICATION

This patent application claims the benefit and priority of French Patent Application No. 2213690, filed on Dec. 16, 2022, the disclosure of which is incorporated by reference herein in its entirety as part of the present disclosure.

TECHNICAL FIELD

The invention relates to the general field of devices for protecting against transient voltage surges all types of circuits, installations, electrical equipment and networks.

The invention relates more particularly to the field of arresters or surge suppressors with gas-filled spark gaps for protecting circuits, electrical installations or equipment and networks against transient voltage surges, caused in particular by lightning strikes.

TECHNOLOGICAL BACKGROUND

Electrical or data transmission networks may be subjected to transient voltage and current surges. Industrial interference and interference generated by starting or stopping motors or alternators, switching in power supply networks or fallen electrical cables at different voltages are for example liable to cause transient voltage and current surges. Furthermore, when these networks include cables suspended above the ground, fixed to electrical posts or other structures over long distances, they are particularly susceptible to be struck by lightning.

Lightning is characterised by a discharge impulse current of high peak intensity with a rise time of the order of one microsecond. Lightning can typically cause voltage surges of several million volts and current surges of thousands of amperes. Now, electrical or data transmission networks are not designed to withstand such transient voltage and current surges.

To protect these networks it is known to use protection devices generally called "arresters" or "surge suppressors" that aim to discharge impulse currents to earth, which enables peak limiting of the voltages to values compatible with the ability to withstand them of the electrical installation and the equipment connected thereto.

Known in particular from FR 3 017 004 are arresters including inert gas-filled spark gaps. A gas-filled spark gap of this kind is a hermetically-sealed electrical component including two conductive electrodes separated by an insulating ceramic inside which an inert gas is trapped. In normal operation of the electrical network, that is to say in the absence of voltage and/or current surges, the gas-filled spark gap has a very high insulation resistance, which may be considered virtually infinite. On the other hand, if it is subjected to a transient voltage surge, the value of which exceeds the striking voltage of the gas-filled spark gap set by the pressure of the inert gas, an electrical arc is struck by ionisation of that inert gas situated between the electrodes: the gas-filled spark gap strikes suddenly and begins to conduct with a very low impedance. The gas-filled spark gap is then similar to a short-circuit that diverts to earth a high discharge current corresponding to the transient voltage surge. It is thus possible to protect the electrical circuits situated downstream of the gas-filled spark gap against impulse currents by evacuating them to earth via the gas-filled spark gap.

Gas-filled spark gaps of this kind are designed to withstand well shock currents, typically 100 kA. The shock current is defined as the maximum ability to withstand surges without destruction or dispersion of the striking electrical characteristics following the passage of a 10/350 μs wave representative of the lightning current generated upon a direct impact.

However, once struck, some of the current from the network, then termed the follow current, flows through the gas-filled spark gap. Gas-filled spark gaps being hermetically sealed—unlike air-filled spark gaps—the electrical arc cannot be blown out in order to suppress the follow current, which greatly limits their arc extinguishing capacity, generally limited to a few hundred amperes.

Now, in the event of prolonged operation of the gas-filled spark gap the electrical arc can cause erosion of the electrodes by detaching metal particles on their surface. These metal particles are then liable to be deposited at some other location in the space situated between the electrodes, thereby creating conductive pollution that risks causing failure of the gas-filled spark gap.

To be more precise, metal particles on the surface of the electrodes that are torn off may lead either to deterioration of the level of protection provided by the gas-filled spark gap because of the uncontrolled increase in the striking voltage of the gas-filled spark gap or the formation of a preferential conductive path between the electrodes resulting from the formation of a partial or total conductive bridge between the electrodes. In the latter case the passage of the electrical current along this bridge also risks leading to abnormal overheating of the spark gap.

SUMMARY OF THE INVENTION

One idea behind the invention is to produce a gas-filled spark gap having a better follow current extinction capacity whilst preserving its electrical striking and withstanding shock currents characteristics.

In accordance with one embodiment the invention provides a gas-filled spark gap for the protection of an electrical installation, including:

- a casing delimiting an internal space, the casing being gastight;
- two elongate electrodes along a propagation trajectory and housed in the internal space, the two electrodes delimiting between them an inter-electrode space, the two electrodes being arranged in such a manner that the inter-electrode space includes successively along the propagation trajectory a striking chamber situated between first portions of the two electrodes to strike an electrical arc between the first portions of the two electrodes and an arc-extinguishing chamber situated between second portions of the two electrodes to extinguish the electrical arc, an isolation distance being defined as a shortest distance between the two electrodes in a plane transverse to said propagation trajectory, the isolation distance between the second portions of the two electrodes being greater than the isolation distance between the first portions of the two electrodes, said arc-extinguishing chamber including mutually spaced divider plates distributed between the second portions of the two electrodes;
- two connecting terminals accessible from outside the casing and intended to enable electrical connection of said gas-filled spark gap to the electrical installation, the two connecting terminals being respectively electrically connected to said two electrodes; and an inert gas trapped in the internal space of the casing.

In accordance with one embodiment the first connecting terminal and the second connecting terminal are intended to enable electrical connection of the gas-filled spark gap between a phase of the electrical installation to be protected and earth.

Alternatively, to obtain differential protection the gas-filled spark gap may be electrically connected between neutral and earth, between phase and earth, or again between two phases.

In accordance with one embodiment the connecting terminals may in particular take the form of tags, elastic clamps or metal screw-cage assemblies typically intended to be engaged on the end of a cable, on a terminal block or on a conductive rail connected to the electrical installation to be protected.

Thanks to these features if a transient voltage surge associated with an impulse current exceeds the striking voltage of the gas-filled spark gap an electrical arc is struck in the striking chamber since the distance that the electrical arc has to travel to connect the two electrodes electrically—called the isolation distance—is shortest there. Because of the effect of the Lorentz force induced by the circulation of an electrical current between the two electrodes, the electrical arc is lengthened at the same time as propagating toward the arc-extinguishing chamber where it is subdivided into a succession of electrical sub-arcs between stacked divider plates. The voltage of the electrical arc being equivalent to the sum of the voltages of the electrical sub-arcs, the electrical arc is in the end spontaneously extinguished between the stacked divider plates.

However, the greater the amplitude of the current, the greater the Lorentz force exerted on the corresponding electrical arc, i.e. the faster the electrical arc propagates toward the arc-extinguishing chamber. An electrical arc associated with an impulse current generated by a lightning strike will therefore tend to propagate faster than an electrical arc associated only with a follow current to be extinguished in the arc-extinguishing chamber.

The greater the electrical current discharged by the electrical arc, the greater the Lorentz force exerted on the electrical arc. The electrical arc therefore propagates all the more rapidly toward the arc-extinguishing chamber. An electrical arc struck by an impulse current generated by a lightning strike, although of brief duration, can therefore propagate sufficiently rapidly to reach the arc-extinguishing chamber and to be extinguished therein by its division.

Now, the discharging of the impulse currents in the arc-extinguishing chamber imposes severe constraints on the dimensions of the gas-filled spark gap and recourse to heat resistant materials, in particular for the divider plates, which impacts the cost of manufacture.

Another idea behind the invention is therefore to limit the cost of manufacturing a gas-filled spark gap of this kind including an arc-extinguishing chamber by producing a geometry that enables selective slowing of the speed of propagation of only electrical arcs struck by an impulse current. Once slowed, the impulse current therefore flows between the two electrodes before the arc reaches the arc-extinguishing chamber. Electrical arcs struck by follow currents, which are not slowed or less slowed, are extinguished by division in said arc-extinguishing chamber.

In accordance with one embodiment the gas-filled spark gap further includes a striking element to encourage the striking of the electrical arc, the striking element being positioned between the first portions of the two electrodes and fixed to an electrically-insulative support.

In accordance with one embodiment the striking element takes the form of a thin layer of graphite in the form of a line. For example, its dimensions may be from 0.5 mm to 1 mm wide and a few microns to tens of microns thick.

The striking element therefore improves striking in the gas-filled spark gap by causing a disruptive discharge to appear between the first portions of the two electrodes in the striking chamber.

In accordance with one embodiment each of the two electrodes includes a third portion situated between the first portion and the second portion and the inter-electrode space further includes an elongation chamber situated between the third portions of the two electrodes to lengthen the electrical arc, the elongation chamber being inserted between the striking chamber and the arc-extinguishing chamber, the two electrodes being arranged so that the isolation distance between the third portions of the two electrodes increases from said striking chamber towards said arc-extinguishing chamber.

The electrical arc in the elongation chamber is therefore guided by the third portions of the two electrodes: it is lengthened as it propagates toward the arc-extinguishing chamber, which “weakens” it.

In accordance with one embodiment a variation of the isolation distance between the first portions of the two electrodes in the striking chamber is less than the variation of the isolation distance between the third portions of the two electrodes in the elongation chamber.

Thus in the striking chamber the inter-electrode space is slightly widened on approaching the electrical arc elongation chamber.

In accordance with one embodiment the first portions of the two electrodes in the striking chamber are parallel.

The isolation distance between the first portions of the two electrodes in the striking chamber is therefore maintained constant and close to the minimum isolation distance.

Thanks to these features the Lorentz force exerted on the electrical arc corresponding to an impulse current struck between the first portions of the two electrodes is minimised. Indeed, the intensity of the Lorentz force is proportional to the isolation distance, which limits the speed of propagation of the electrical arc in the striking chamber.

In accordance with one embodiment the two electrodes are arranged so that the inter-electrode space is horn-shaped.

In accordance with one embodiment the mouth of the horn is situated at the level of the striking chamber while the bell of the horn extends in the elongation chamber.

Indeed, unlike a follow current electrical arc, the discharge of an electrical arc struck by an impulse current produces local pressure waves that propagate from the striking chamber in the horn-shaped inter-electrode space so as to be reflected in the elongation chamber or at the level of or downstream of the arc-extinguishing chamber. These reflected pressure waves exert on the electrical arc a force tending to oppose the Lorentz force, which limits the speed of propagation of the electrical arc toward the arc-extinguishing chamber.

The horn shape imparted by the electrodes to the inter-electrode space moreover allows production of a compact gas-filled spark gap.

In accordance with one embodiment the divider plates include notches, each notch having an opening oriented toward the striking chamber.

The presence of notches of this kind therefore has a favourable influence on the entry of the electrical arc into the arc-extinguishing chamber.

In accordance with one embodiment the second portions of the two electrodes are parallel in the arc-extinguishing chamber and the divider plates are parallel to the second portions of the two electrodes and disposed at regular intervals perpendicular to the plane transverse to the propagation trajectory.

In accordance with one embodiment the gas-filled spark gap includes two insulating plates disposed in the internal space of the casing, the two insulating plates being arranged so as to surround some or all of the first portions of the two electrodes and the third portions of the two electrodes.

Positioning the stop plate downstream of the divider plates therefore enables accentuation of the reflection effects of the pressure waves generated by the discharge of the impulse currents, which enables further slowing of the speed of propagation of the corresponding electrical arcs.

In accordance with one embodiment the gas-filled spark gap further includes two insulating plates disposed in the internal space of the casing, the two insulating plates being arranged so as to surround some or all of the first portions of the two electrodes and the third portions of the two electrodes.

The propagation of the electrical arc in all or part of the striking chamber and the elongation chamber is therefore delimited by the insulating plates.

In accordance with one embodiment the gas-filled spark gap further includes two deflector plates housed in the internal space of the casing, each deflector plate being inserted between said casing and a respective insulating plate at the level of the elongation chamber.

The deflector plates, made of steel for example, therefore contribute to channelling the magnetic field so that this magnetic field interacting with the electrical arc causes the electrical arc to propagate toward the arc-extinguishing chamber.

In accordance with one embodiment the casing is made of insulative material.

In accordance with one embodiment the casing includes an insulating base and an insulating lid connected in gastight manner, the sealed connection between the insulating base and the insulating lid being made by solder, for example Ag—Cu solder.

In accordance with one embodiment the insulating base has open ends intended to be in gastight contact with the insulating lid, the open ends including a layer of molybdenum-manganese covered with a layer of nickel.

In accordance with one embodiment the insulating base includes at least two facing walls and a bottom wall, the second portions of the two electrodes being respectively pressed against the two walls, the bottom wall including two electrode grooves in the striking chamber and/or plate grooves in the arc-extinguishing chamber, the two electrodes being mounted in the two electrode grooves and the divider plates being mounted in the plate grooves.

In accordance with one embodiment an assembly consisting of the two insulating plates includes two electrode grooves and plate grooves, the two electrodes being mounted in the two electrode grooves and the divider plates being mounted in the plate grooves.

In accordance with one embodiment the casing includes an insulative material peripheral wall having two opposite open ends, the two connecting terminals being formed by two metal plates covering the respective opposite ends in gastight manner, the sealed connection between the peripheral wall and each of the two connecting terminals being made by solder.

In accordance with one embodiment two insulating plates are disposed in the internal space of the casing, the two insulating plates being arranged so as to surround the two electrodes, and two deflector plates are respectively inserted between the two insulating plates and the two connecting terminals.

Thanks to these features mounting the two electrodes and the divider plates in the internal space of the casing is facilitated.

In accordance with one embodiment the two electrodes are made of a metal selected in the group consisting of copper and its alloys.

In accordance with one embodiment the inert gas trapped in the internal space of the casing is selected from the group consisting of argon, neon, dihydrogen, dinitrogen, rare gases and mixtures of those gases.

In accordance with one embodiment the inert gas includes dihydrogen.

The choice of the inert gas or of the composition of the inert gases enables fine adjustment of the striking conditions of the gas-filled spark gap and limitation of the time for which the electrical arc is maintained between the electrodes, which improves the follow current extinction capacity of the gas-filled spark gap.

BRIEF DESCRIPTION OF THE FIGURES

The invention will be better understood and other aims, details, features and advantages thereof will become more clearly apparent in the course of the following description of particular embodiments of the invention given by way of non-limiting illustration only with reference to the appended drawings.

FIG. 1 is a schematic representation of an electrical network including a protection device taking the form of a gas-filled spark gap.

FIG. 2 is a perspective view of a gas-filled spark gap according to the invention.

FIG. 3 is an exploded perspective view of the gas-filled spark gap from FIG. 2.

FIG. 4 is a view in section from above of the gas-filled spark gap from FIG. 2.

FIG. 5 is a perspective view of the insulating base of the casing of the gas-filled spark gap from FIG. 2.

FIG. 6 is a cutaway perspective view of the gas-filled spark gap from FIG. 2, the insulating lid of the casing being omitted.

FIG. 7 shows an exploded perspective view of a gas-filled spark gap in accordance with another embodiment of the present disclosure.

DESCRIPTION OF EMBODIMENTS

The following embodiments are described in connection with a gas-filled spark gap intended to limit transient voltage surges in an electrical or data transmission network including an electrical line to be protected, for example a telecommunication network, a very high power energy transport network such as a high-voltage network, or a medium- or low-voltage network.

The gas-filled spark gap described hereinafter is more generally intended to be connected to any type of apparatus, installation or network powered electrically and liable to be subjected to transient disturbances, caused in particular by lightning. A gas-filled spark gap of this kind can therefore advantageously constitute an arrester.

Referring to FIG. 1, an electrical line 1 to be protected is connected by a gas-filled spark gap 2 to another electrical line 3, for example an earthing connection, another discharge line, or any other electrical line of the network. The gas-filled spark gap 2 is therefore shunt-connected (or parallel-connected) to the electrical line 1 to be protected.

The electrical line 1 to be protected carries an AC or DC voltage.

Referring to FIG. 2, the gas-filled spark gap 2 includes a hollow parallelepiped-shaped casing 4 delimiting an internal space 5 (visible in FIG. 3). The casing 4 is made of ceramic materials for example, preferably alumina. The casing 4 is preferably covered by an enclosure or a coating providing mechanical protection and electrical insulation, for example made of plastic material, in particular PBT or PA. Alternatively, insulating materials other than ceramics may be employed to produce the casing 4.

The casing 4 includes an insulating base 6 and an insulating lid 7. The insulating base 6 includes a bottom wall 8 and two longitudinal walls 9 interconnected by two transverse walls 10. As represented here, the longitudinal walls 9 have a dimension greater than that of the transverse walls 10.

One of the transverse walls 10 of the insulating base 6 includes a first connecting terminal 11 and a second connecting terminal 12. The first connecting terminal 11 and the second connecting terminal 12 form electrical connection interfaces between the interior and the exterior of the casing 4 in order to enable connection of the gas-filled spark gap 2 to the electrical line 1 to be protected.

For example, the first connecting terminal 11 may be electrically connected to the electrical line 1 to be protected and the second connecting terminal 12 may be electrically connected to an earth connection.

In FIGS. 2 to 4 the first connecting terminal 11 and the second connecting terminal 12 take the form of connecting studs, made of copper for example, a copper and tungsten alloy or any other appropriate metal or alloy.

In a variant (not represented) the first connecting terminal 11 and the second connecting terminal 12 may in particular take the form of tags, spring clamps or metal screw-cage assemblies, typically intended to be engaged on the end of a cable, a terminal block or a conductive rail connected to the electrical line 1 to be protected.

Referring to FIGS. 3 and 4 the hollow casing 4 delimits an internal space 5 inside which are housed two electrodes 13, 14. Each electrode 13, 14 is electrically connected to a connecting terminal 11, 12 by a connecting means 15, 16.

The electrodes 13, 14 and the connecting means 15, 16 advantageously form one-piece members. An arrangement of this kind makes it possible to eliminate connecting means (rivets, screws or filler metal) to avoid delicate and costly assembly operations.

Each electrode 13, 14 takes the form of a metal strip extending along a propagation trajectory T of an electrical arc and the thickness of which is of the order of the height of the insulating base 6 of the casing 4. The two electrodes 13, 14 may be made of copper, an alloy of copper and tungsten or any other appropriate metal or alloy.

The two electrodes 13, 14 delimit an inter-electrode space including a striking chamber 17 situated between first portions 18, 19 of the two electrodes 13, 14 to strike an electrical arc, an arc-extinguishing chamber 20 situated between the second portions 21, 22 of the two electrodes 13, 14 to extinguish the electrical arc, and an elongation chamber 23 situated between third portions 24, 25 of the two electrodes 13, 14 to lengthen said electrical arc. The elongation chamber 23 is inserted between the striking chamber 17 and the arc-extinguishing chamber 20.

Referring to FIGS. 4 and 5, the insulating base 6 of the casing 4 advantageously includes electrode grooves 26 in the striking chamber 17. The electrode grooves 26 are then crossed by the first portions 18, 19 of the two electrodes 13, 14, which enables positioning of the two electrodes 13, 14 in the internal space 5 of the casing 4. Alternatively, the electrode grooves 26 may be placed in the elongation chamber 23; they are then crossed by the third portions 24, 25 of the two electrodes 13, 14.

The "isolation distance", denoted $d_i$, is the distance that the electric arc has to travel to connect the two electrodes 13, 14 electrically. The propagation trajectory T corresponds to the trajectory of the electrical arc in the inter-electrode space. At a point on the propagation trajectory T the isolation distance $d_i$ is identified as being the shortest distance between the two electrodes 13, 14 in the plane perpendicular to the tangent at the point concerned of the propagation trajectory T.

As can be seen in FIG. 4, the isolation distance $d_i$ increases from the striking chamber 17 to the arc-extinguishing chamber 20 via the elongation chamber 23. In particular, the isolation distance $d_i$ is minimal between the first portions 18, 19 of the two electrodes 13, 14 in the striking chamber 17. It increases between the third portions 24, 25 of the two electrodes 13, 14 in the elongation chamber 23. Finally, the isolation distance $d_i$ is maximal between the second portions 21, 22 of the two electrodes 13, 14 in the arc-extinguishing chamber 20.

Given the composition and the pressure of the inert gas trapped in the internal space 5 of the casing 4, the minimal isolation distance $d_i$ participates in the definition of the striking voltage from which the gas-filled spark gap 2 is activated, that is to say from which electrical current the gas-filled spark gap 2 diverts said current to an earth line or more generally a discharge line.

Referring to FIG. 6, to encourage striking of an electrical arc in the striking chamber 17 the gas-filled spark gap 2 includes a conductive striking element 27, for example a line of graphite, fixed to the internal isolating surface 28 of the casing 4 so as to cause a disruptive discharge to appear between the first portions 18, 19 of the two electrodes 13, 14.

The inert gas trapped in the casing 4 of the gas-filled spark gap 2 is for example argon Ar, neon Ne, dinitrogen $N_2$, dihydrogen $H_2$, helium He, a mixture of these or other gases. The inert gas advantageously includes dihydrogen $H_2$. This inert gas is at an absolute pressure in the gas-filled spark gap 2 from 0.5 bar (50 kPa) to 2 bar (200 kPa). As indicated, this pressure influences the striking voltage of the gas-filled spark gap 2. The inert gas can therefore be trapped in the gas-filled spark gap 2 at different pressures depending on the required striking voltage.

In order to trap the inert gas in the gas-filled spark gap 2 the internal space 5 of the casing 4 is sealed. The seal is made between the insulating base 6 and the insulating lid 7 by any appropriate means.

For example, a molybdenum-manganese layer may be used to cover an edge region of the edges of the insulating base 6 and a corresponding surface of the insulating lid 7, this molybdenum-manganese layer being itself covered by a layer of nickel. The seal between the insulating base 6 and the insulating lid 7 may be made by melting Ag—Cu solder, denoted 28, between the insulating lid 7 and the layer of nickel, typically in a furnace at 780° C.

Alternatively, the seal between the insulating base 6 and the insulating lid 7 may be produced by Ag—Cu—Ti solder deposited directly on the insulating base 6 and the ceramic (alumina) insulating lid 7.

Another way to provide this seal is gluing by means of a glue compatible with alumina. A further technique consists in using a seal and mechanical clamping of the two parts onto that seal.

If a transient voltage surge associated with an impulse current exceeds the striking voltage of the gas-filled spark gap 2 an electrical arc is struck in the striking chamber 17 where the isolation distance $d_i$ between the first portions 18, 19 of the two electrodes 13, 14 is the minimum distance.

This electrical arc is subjected to the Lorentz force induced by the flow of an electrical current between the two electrodes 13, 14. The electrical arc is then located in a current loop and so the Lorentz force exerted on the loop tends to open the loop (this effect is sometimes called the "loop effect"). The Lorentz force exerted on the electrical arc therefore tends to "push" it toward the elongation chamber 23.

In the elongation chamber 23 the electrical arc is guided by the third portions 24, 25 of the two electrodes 13, 14. The electrical arc is lengthened as it propagates toward the arc-extinguishing chamber 20, which "weakens" it.

The arc-extinguishing chamber 20 includes plane dividing plates 29 stacked at regular intervals between the second portions 21, 22 of the two electrodes 13, 14 parallel to the longitudinal walls 9 of the insulating base 6 of the casing 4. The height of the dividing plates 29 is substantially equal to the height of the insulating base 6 of the casing 4 and thus substantially equal to the thickness of the two electrodes 13, 14. The divider plates 29 are preferably made of a ferromagnetic metal, for example mild steel.

Referring to FIG. 5, the bottom wall 8 of the insulating base 6 of the casing 4 includes a plate support 30. The plate support 30 includes plate ribs 31 in which the divider plates 29 are nested and fixed. Mounting the divider plates 29 in the plate ribs 31 of the plate support 30 enables a rigid arc-extinguishing chamber 20 to be formed. The bottom wall 8 and the plate support 30 advantageously form a one-piece assembly.

When the electrical arc reaches the arc-extinguishing chamber 20 it is divided into a succession of electrical sub-arcs between the stacked divider plates 29. The voltage of the electric arc being equivalent to the sum of the voltages of the electrical sub-arcs, the electrical arc is in the end spontaneously extinguished between the stacked divider plates 29.

Twelve divider plates 29 are represented in FIGS. 3 and 4. Alternatively, the arc-extinguishing chamber 20 may include more than or fewer than twelve divider plates 29. Note that the arc extinguishing capacity of the gas-filled spark gap 2 is a function of the number of divider plates 29 stacked in the arc-extinguishing chamber 20. This number can therefore be adapted according to the nature of the electrical device (circuit, network, equipment, installation, etc.) to be protected.

To prevent expansion of the electrical arc over the two deflector plates 33 the gas-filled spark gap 2 includes two insulating plates 32 housed in the internal space 5 of the casing 4 and adapted to surround some of the first portions 18, 19 of the two electrodes 13, 14 and the third portions 24, 25 of the two electrodes 13, 14. As depicted here, the two insulating plates 32 extend parallel to the insulating lid 7 and to the bottom wall 8 of the casing 4.

The gas-filled spark gap 2 further includes two deflector plates 33 housed in the internal space 5 of the casing 4, each deflector plate 33 being inserted between said casing 4 and the insulating plate 32 at the level of the elongation chamber 23.

The greater the electrical current discharged by the electrical arc, the greater the Lorentz force exerted on the electrical arc. The electrical arc therefore propagates commensurately more rapidly toward the arc-extinguishing chamber 20. An electrical arc struck by an impulse current generated for example by a lightning strike, although of brief duration, can therefore propagate sufficiently rapidly to reach the arc-extinguishing chamber 20 and to be extinguished therein by dividing it.

Now, the discharge of the impulse currents in the arc-extinguishing chamber 20 imposes important constraints on the dimensions of the gas-filled spark gap 2 and recourse to heat resistant materials, in particular for the divider plates 29, which impacts the cost of manufacturing the gas-filled spark gap 2.

To reduce or even to eliminate the proportion of impulse current electrical arcs that migrate toward the extinguishing chamber 20 their speed must be selectively slowed. Indeed, once the propagation speed has decreased, the impulse current electrical arcs, which already have short discharge times, are extinguished before reaching the arc-extinguishing chamber 20. On the other hand, electrical arcs struck by follow currents, which generally have longer discharge times, have time to propagate as far as the arc-extinguishing chamber 20 to be extinguished therein by dividing them.

The propagation speed of an electrical arc depends on numerous parameters and in particular the materials of the electrodes 13, 14, the insulation resistance in the internal space 5 (which depends on the composition of the trapped inert gas and "obstacles" placed on the propagation trajectory T of the electrical arc) and the nature and the intensity of the forces exerted on the electrical arc.

Referring to FIG. 4, there can be seen the isolation distance $d_i$ between the first portions 18, 19 of the two electrodes 13, 14 that is maintained equal to or close to the minimum isolation distance $d_i$. In the striking chamber 17 the first portions 18, 19 of the two electrodes 13, 14 are therefore essentially parallel and the inter-electrode space widens slightly on approaching the elongation chamber 23.

The Lorentz force exerted on the electrical arcs struck in the striking chamber is therefore minimised since the intensity of that force is proportional to the isolation distance $d_i$, which makes it possible to slow the propagation speed of the electrical arc in the striking chamber 17.

The two electrodes 13, 14 are advantageously adapted to confer on the inter-electrode space a horn shape the mouth of which is situated at the level of the striking chamber 17 and the bell of which extends in the elongation chamber 23.

Indeed, unlike a follow current electrical arc, the discharge of an electrical arc struck by an impulse current reduces local pressure waves that propagate from the striking chamber 17 in the horn-shaped part of the inter-electrode space so as to be reflected into the elongation chamber 23 or at the level of or downstream of the arc-extinguishing chamber 20. These reflected pressure waves exert on the electrical arc a force tending to oppose the Lorentz force, which limits the speed of propagation of the electrical arc toward the arc-extinguishing chamber 20.

Referring to FIGS. 4 and 5, to accentuate the effect of reflection of pressure waves generated by the discharge of impulse currents, a stop plate 34 made of ceramic material, for example alumina, is advantageously positioned perpendicularly to the propagation trajectory T, downstream of the divider plates 29. As represented here, the stop plate 34 is still situated in the arc-extinguishing chamber 20. Alternatively, the stop plate 34 could be located downstream of the divider plates 29 outside the inter-electrode space.

Referring to FIG. 3, the divider plates 29 advantageously include V-shaped notches the openings of which are oriented toward the striking chamber. The isolation resistance and thus the resistance to flow of current therefore remain high at the inlet of the arc-extinguishing chamber 20.

EXAMPLE

The dimensions of the casing 4 are for example 58×44×16 mm or less.

FIG. 7 shows a gas-filled spark gap 102 in accordance with another embodiment in an exploded perspective view. Elements analogous or identical to those in FIGS. 2 to 6 bear the same reference number increased by 100.

In this embodiment the casing 104 of the gas-filled spark gap 102 is of cylindrical shape. The two connecting terminals 111 and 112 are metal discs that respectively form the two lids of the casing 104. The lateral wall 136 of the casing 104 is for example made of ceramic materials, preferably alumina. It is preferably covered by an enclosure or a coating providing mechanical protection and electrical insulation, for example one made of plastic material, in particular PBT or PA. Alternatively, insulating materials other than ceramics may be employed to produce the lateral wall 136. The seal between the lateral wall 136 and the two connecting terminals 111, 112 is produced by solder, as described above.

The gas-filled spark gap 102 also differs from the gas-filled spark gap 2, depicted in particular in FIG. 3, in that the electrodes grooves 126*a*, 126*b* and the plate grooves 131 are produced on the insulating plates 132*a*, 132*b*. To be more precise, in FIG. 7 an electrode groove 126*a* is produced on the insulating plate 132*a* espousing the shape of the electrode 113 from the striking chamber as far as the arc-extinguishing chamber and an electrode groove 126*b* is produced on the insulating plate 132*b* in the striking chamber. The plate grooves 131 are produced on the insulating plate 132*a*. In this embodiment the insulating plates 132*a*, 132*b* are not symmetrical.

The gas-filled spark gap 102 further includes an insulating spacer 135 positioned between the two electrodes 113, 114 in the striking chamber to maintain a gap between them. The insulating spacer 135 also makes it possible to maintain the insulating plate 132*a* pressed against the connecting terminal 111 and the insulating plate 132*b* pressed against the connecting terminal 112.

Although the invention has been described with reference to particular embodiments it is obvious that it is in no way limited to them and that it encompasses all technical equivalents of the means described and combinations thereof if the latter fall within the scope of the invention.

Use of the verb "to include" or "to comprise" and conjugate forms thereof does not exclude the presence of elements or steps other than those stated in a claim.

In the claims, any reference sign between parentheses should not be interpreted as a limitation of the claim.

What is claimed is:

1. A gas-filled spark gap for the protection of an electrical installation, including:

a casing delimiting an internal space, the casing being gastight;

two elongate electrodes along a propagation trajectory and housed in the internal space, the two elongate electrodes delimiting between them an inter-electrode space, the two elongate electrodes being arranged in such a manner that the inter-electrode space includes successively, along the propagation trajectory, a striking chamber situated between first portions of the two elongate electrodes to strike an electrical arc between the first portions of the two elongate electrodes and an arc-extinguishing chamber situated between second portions of the two elongate electrodes to extinguish the electrical arc, an isolation distance being defined as a shortest distance between the two elongate electrodes in a plane transverse to the propagation trajectory, the isolation distance between the second portions of the two elongate electrodes being greater than the isolation distance between the first portions of the two elongate electrodes, the arc-extinguishing chamber including mutually spaced divider plates distributed between the second portions of the two elongate electrodes;

two connecting terminals accessible from outside the casing and intended to enable electrical connection of the gas-filled spark gap to the electrical installation, the two connecting terminals being respectively electrically connected to the two elongate electrodes;

an inert gas trapped in the internal space of the casing; and a striking element to encourage the striking of the electrical arc, the striking element being positioned between the first portions of the two elongate electrodes and fixed to an electrically-insulative support.

2. The gas-filled spark gap according to claim 1, in which the striking element takes the form of a thin layer of graphite in the form of a line.

3. A gas-filled spark gap for the protection of an electrical installation, including:

a casing delimiting an internal space, the casing being gastight;

two elongate electrodes along a propagation trajectory and housed in the internal space, the two elongate electrodes delimiting between them an inter-electrode space, the two elongate electrodes being arranged in such a manner that the inter-electrode space includes successively, along the propagation trajectory, a striking chamber situated between first portions of the two elongate electrodes to strike an electrical arc between the first portions of the two elongate electrodes and an arc-extinguishing chamber situated between second portions of the two elongate electrodes to extinguish the electrical arc, an isolation distance being defined as a shortest distance between the two elongate electrodes in a plane transverse to the propagation trajectory, the isolation distance between the second portions of the two elongate electrodes being greater than the isolation distance between the first portions of the two elongate electrodes, the arc-extinguishing chamber including mutually spaced divider plates distributed between the second portions of the two elongate electrodes;

two connecting terminals accessible from outside the casing and intended to enable electrical connection of the gas-filled spark gap to the electrical installation, the two connecting terminals being respectively electrically connected to the two elongate electrodes;

an inert gas trapped in the internal space of the casing; and wherein the casing includes an insulating base and an insulating lid connected in gastight manner, the sealed connection between the insulating base and the insulating lid being made by solder.

4. The gas-filled spark gap according to claim 3, in which the insulating base has open ends intended to be in gastight contact with the insulating lid, the open ends including a layer of molybdenum-manganese covered with a layer of nickel.

5. The gas-filled spark gap according to claim 3, in which the insulating base includes at least two facing walls and a bottom wall, the second portions of the two elongate electrodes being respectively pressed against the two walls, the bottom wall including two electrode grooves in the striking chamber and plate grooves in the arc-extinguishing chamber, the two elongate electrodes being mounted in the two electrode grooves and the divider plates being mounted in the plate grooves.

6. The gas-filled spark gap according to claim 3, in which the casing-includes an insulative material peripheral wall having two opposite open ends, the two connecting terminals being formed by two metal plates covering the respective opposite ends in gastight manner, the sealed connection between the peripheral wall and each of the two connecting terminals being made by solder.

7. The gas-filled spark gap according to claim 6, further including:

two insulating plates disposed in the internal space of the casing, the two insulating plates being arranged so as to surround the two elongate electrodes; and two deflector plates respectively inserted between the two insulating plates and the two connecting terminals.

8. The gas-filled spark gap according to claim 3, in which the two elongate electrodes are made of a metal selected in the group consisting of copper and its alloys.

9. The gas-filled spark gap according to claim 3, in which the solder comprises Ag—Cu solder.

10. A gas-filled spark gap for the protection of an electrical installation, including:

a casing delimiting an internal space, the casing being gastight;

two elongate electrodes along a propagation trajectory and housed in the internal space, the two elongate electrodes delimiting between them an inter-electrode space, the two elongate electrodes being arranged in such a manner that the inter-electrode space includes successively, along the propagation trajectory, a striking chamber situated between first portions of the two elongate electrodes to strike an electrical arc between the first portions of the two elongate electrodes and an arc-extinguishing chamber situated between second portions of the two elongate electrodes to extinguish the electrical arc, an isolation distance being defined as a shortest distance between the two elongate electrodes in a plane transverse to the propagation trajectory, the isolation distance between the second portions of the two elongate electrodes being greater than the isolation distance between the first portions of the two elongate electrodes, the arc-extinguishing chamber including mutually spaced divider plates distributed between the second portions of the two elongate electrodes;

two connecting terminals accessible from outside the casing and intended to enable electrical connection of the gas-filled spark gap to the electrical installation, the two connecting terminals being respectively electrically connected to the two elongate electrodes;

an inert gas trapped in the internal space of the casing; and wherein the inert gas includes dihydrogen.

11. The gas-filled spark gap according to claim 10, in which each of the two elongate electrodes includes a third portion situated between the first portion and the second portion and the inter-electrode space further includes an elongation chamber situated between the third portions of the two elongate electrodes to lengthen the electrical arc, the elongation chamber being inserted between the striking chamber and the arc-extinguishing chamber, the two elongate electrodes being arranged so that the isolation distance between the third portions of the two elongate electrodes increases from the striking chamber towards the arc-extinguishing chamber.

12. The gas-filled spark gap according to claim 11, in which a variation of the isolation distance between the first portions of the two elongate electrodes in the striking chamber is less than the variation of the isolation distance between the third portions of the two elongate electrodes in the elongation chamber.

13. The gas-filled spark gap according to claim 11, further including two insulating plates disposed in the internal space of the casing, the two insulating plates being arranged so as to surround some or all of the first portions of the two elongate electrodes and the third portions of the two elongate electrodes.

14. The gas-filled spark gap according to claim 13, further including two deflector plates housed in the internal space of the casing, each deflector plate being inserted between the casing and a respective insulating plate at the level of the elongation chamber.

15. The gas-filled spark gap according to claim 10, in which the first portions of the two elongate electrodes in the striking chamber are parallel.

16. The gas-filled spark gap according to claim 10, in which the two elongate electrodes are arranged so that the inter-electrode space is horn-shaped.

17. The gas-filled spark gap according to claim 10, in which the divider plates include notches, each notch having an opening oriented toward the striking chamber.

18. The gas-filled spark gap according to claim 10, in which the second portions of the two elongate electrodes are parallel in the arc-extinguishing chamber and in which the divider plates are parallel to the second portions of the two elongate electrodes and disposed at regular intervals perpendicular to the plane transverse to the propagation trajectory.

19. The gas-filled spark gap according to claim 18, including an insulative material stop plate positioned perpendicularly to the propagation trajectory downstream of the divider plates along the propagation trajectory.

20. The gas-filled spark gap according to claim 10, in which the two elongate electrodes are made of a metal selected in the group consisting of copper and its alloys.

* * * * *